United States Patent [19]

Furutani et al.

[11] Patent Number: 4,828,064
[45] Date of Patent: May 9, 1989

[54] FOUR-WHEEL STEERING DEVICE FOR VEHICLE

[75] Inventors: Shigeki Furutani; Hirotaka Kanazawa; Teruhiko Takatani; Hideharu Masumoto, all of Hiroshima, Japan

[73] Assignee: Mazda Motor Corporation, Hiroshima, Japan

[21] Appl. No.: 65,651

[22] Filed: Jun. 24, 1987

Related U.S. Application Data

[63] Continuation of Ser. No. 740,763, Jun. 3, 1985, abandoned.

[30] Foreign Application Priority Data

Jun. 6, 1984 [JP] Japan ............................ 59-116106

[51] Int. Cl.⁴ ............................................. B62D 5/04
[52] U.S. Cl. ................................ 180/140; 364/424.05
[58] Field of Search ............... 180/140, 141, 142, 143, 180/79.1, 252; 280/91; 364/424

[56] References Cited

U.S. PATENT DOCUMENTS

| 4,412,594 | 11/1983 | Furukawa et al. | 180/142 |
| 4,418,780 | 12/1983 | Ito et al. | 180/142 |
| 4,527,654 | 7/1985 | Shibahata et al. | 180/142 |

FOREIGN PATENT DOCUMENTS

| 3338702 | 5/1984 | Fed. Rep. of Germany. |
| 3438084 | 5/1985 | Fed. Rep. of Germany. |
| 20565 | 2/1983 | Japan | 180/140 |

Primary Examiner—Charles A. Marmor
Assistant Examiner—Everett G. Diederiks, Jr.
Attorney, Agent, or Firm—Gerald J. Ferguson, Jr.

[57] ABSTRACT

In a four-wheel steering system for a vehicle, a rear wheel turning mechanism for turning the rear wheels is controlled so that the ratio of the rear wheel turning angle to the front wheel turning angle changes with change in the vehicle speed. The ratio of the rear wheel turning angle to the front wheel turning angle is set so that the vehicle lateral acceleration response characteristics and the vehicle heading response characteristics generated by operation of the steering wheel approximate each other as far as possible.

8 Claims, 8 Drawing Sheets

FOUR-WHEEL STEERING DEVICE FOR VEHICLE

This application is a continuation of Ser. No. 740,763, filed June 3, 1985, now abandoned.

BACKGROUND OF THE INVENTION

1. Field of the Invention

This invention relates to a steering system for a vehicle, and more particularly to a four-wheel steering system for a vehicle in which the rear wheels are arranged to be turned in response to the turning of the front wheels when the steering wheel is turned.

2. Description of the Prior Art

In U.S. Pat. No. 4,418,780, there is disclosed a four-wheel steering system for a vehicle in which a front wheel turning mechanism for turning front wheels and a rear wheel turning mechanism for turning rear wheels are provided, and the rear wheel turning angle characteristics with respect to the front wheel turning angle is changed according to the vehicle speed so that the rear wheel turning mechanism is controlled to nullify the side slip angle of the vehicle body according to the vehicle speed and the front wheel turning angle.

In accordance with the four-wheel steering system having such rear wheel turning angle characteristics that nullify the side slip angle of the vehicle body, the rear wheels are turned in the direction opposite to the turning direction of the front wheel (reverse phase) during low speed travel of the vehicle, thereby improving the cornering performance to reduce the minimum turning radius of the vehicle, while the rear wheels are turned in the same direction as the front wheels (same phase) during high speed travel of the vehicle, thereby improving the steering performance to facilitate smooth lane changing.

The four-wheel steering system is aimed at obtaining an effect whereby the vehicle travels in a direction tangential to the desired turning circle (i.e., the lateral acceleration of the vehicle conforms with the cornering motion) so that the driver can accurately predict the traveling direction of the vehicle and can drive the vehicle with a natural feeling.

However, in the actual steering performance of the vehicle, the steering characteristics that nullify the side slip angle are not always considered, by the driver, to provide good steering performance and high stability since the response characteristics of the lateral acceleration to operation of the steering wheel differs from that of the yaw rate.

SUMMARY OF THE INVENTION

In view of the foregoing observations and description, the primary object of the present invention is to provide a four-wheel steering system for a vehicle in which the ratio of the rear wheel turning angle to the front wheel turning angle controlled to change according to the vehicle speed is set so that the driving performance and the stability felt by the driver can be improved.

In accordance with the present invention, the rear wheel turning mechanism is controlled so that the ratio of the rear wheel turning angle to the front wheel turning angle changes with change in the vehicle speed, the ratio of the rear wheel turning angle to the front wheel turning angle being set so that the vehicle lateral acceleration response characteristics and the vehicle heading (yaw rate) response characteristics generated by operation of the steering wheel approximate each other as far as possible.

By setting the ratio of the rear wheel turning angle to the front wheel turning angle so that the vehicle lateral acceleration response characteristics and the vehicle heading response characteristics approximate each other, the lateral acceleration and the heading are generated simultaneously with each other upon operation of the steering wheel, the orientation of the vehicle body changes by heading while the driver experiences the lateral acceleration, and accordingly the steering performance, the stability and the driver's operating perception are improved.

DESCRIPTION OF THE PREFERRED EMBODIMENT

Figure 1:
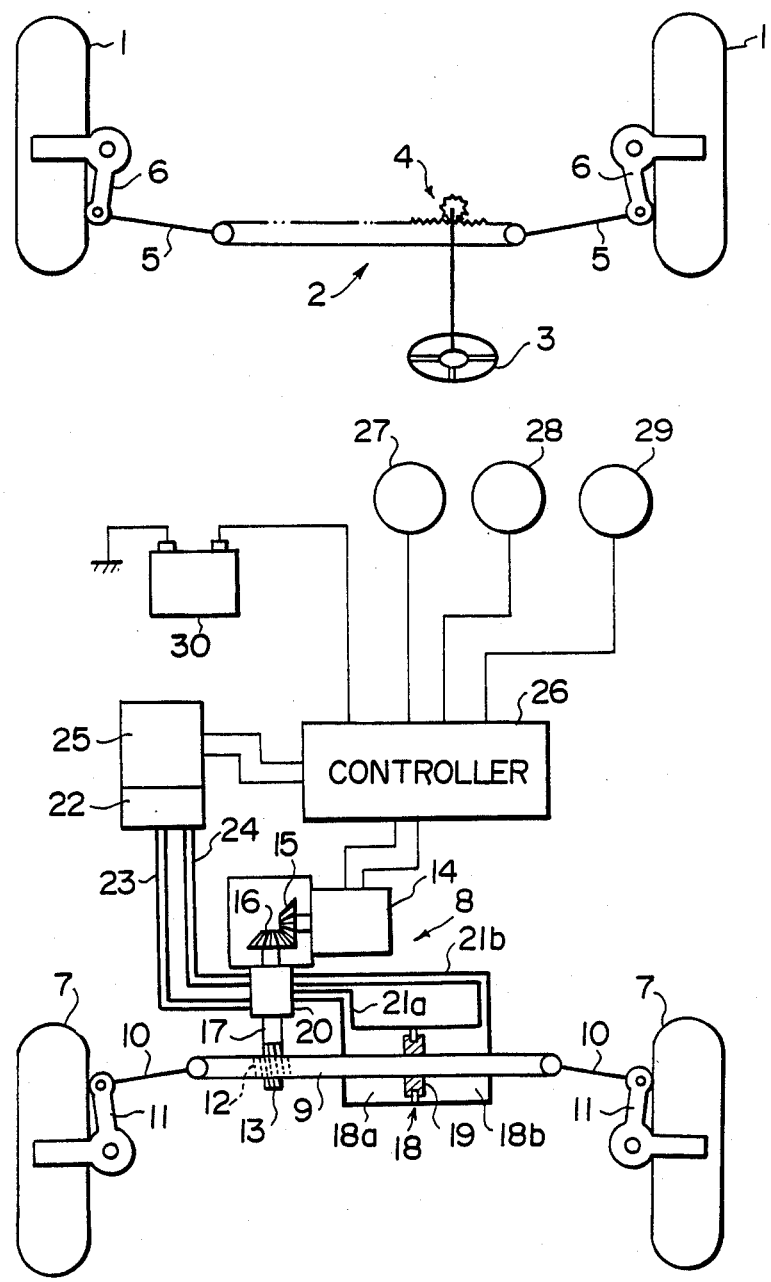
FIG. 1 is a schematic plan view showing a four-wheel steering system in accordance with an embodiment of the present invention.

In FIG. 1, a front wheel turning mechanism 2 for turning right and left front wheels 1 comprises a steering wheel 3, a rack-and-pinion mechanism 4 for converting rotary motion of the steering wheel 3 into linear reciprocating movement, and right and left tie rods 5 and knuckle arms 6 for transmitting the movement of the rack-and-pinion mechanism 4 to the front wheels 1 to turn them.

A rear wheel turning mechanism 8 for turning right and left rear wheels 7 comprises a rear wheel turning rod 9 supported on the vehicle body for sliding movement in the transverse direction of the vehicle body, and right and left knuckle arms 11 connected to the respective ends of the rear wheel turning rod 9 by way of tie rods 10 so that the rear wheels 7 are turned in response to axial movements of the rear wheel turning rod 9. A rack 12 is formed on the rear wheel turning rod 9 and a pinion 13 is in mesh with the rack 12. The pinion 13 is operatively connected to a pulse motor 14 by way of a pair of bevel gears 15 and 16 and a pinion shaft 17 to be rotated thereby. Thus, the rear wheels 7 are turned corresponding to the amount and the direction of rotation of the pulse motor 14.

The rear wheel turning rod 9 extends through a power cylinder 18 and a piston 19 dividing the internal space of the cylinder 18 into right and left hydraulic pressure chambers 18a and 18b is fixed to the rear wheel turning rod 9. The right and left hydraulic pressure chambers 18a and 18b are connected to a control valve 20 disposed near the pinion shaft 17 by way of hydraulic pressure passages 21a and 21b, respectively. The control valve 20 is connected by way of a hydraulic pressure feeding passage 23 and a return passage 24 to an oil pump 22 which is driven by an electric motor 25.

The control valve 20 is actuated in response to a rotating force exerted on the pinion shaft 17 when the pulse motor 14 rotates to transmit hydraulic pressure fed from the oil pump 22 by way of the hydraulic pressure feeding passage 23 to one of the hydraulic pressure chambers 18a and 18b of the power cylinder according to the direction of the rotating force exerted on the pinion shaft 17 and to return oil in the other hydraulic pressure chamber to the oil pump 22 by way of the return passage 24. That is, when the rear wheel turning rod 9 is moved in the axial direction by the pulse motor 14 by way of the bevel gears 15 and 16, the pinion shaft 17, the pinion 13 and the rack 12, the hydraulic pressure introduced into one of the hydraulic pressure chambers 18a and 18b assists the movement of the rear wheel turning rod 9 by way of the piston 19.

The pulse motor 14 of the rear wheel turning mechanism 8 and the electric motor 25 for driving the oil pump 22 are controlled by a control signal output from a controller 26. A steering wheel turning angle signal from a steering wheel turning angle sensor 27, a vehicle speed signal from a vehicle speed sensor 28 and a load signal from a load sensor 29 for detecting load on the vehicle are input into the controller 26. A battery 30 is connected to the controller 26.

The oil pump 22 may be belt-driven by the engine instead of being driven by the electric motor 25. The steering wheel turning angle sensor 27 may be arranged to directly detect the turning angle of the steering wheel 3 or to detect the same by way of the amount of movement of a member which is moved in response to operation of the steering wheel 3, e.g., the rack-and-pinion mechanism 4.

Figure 2:
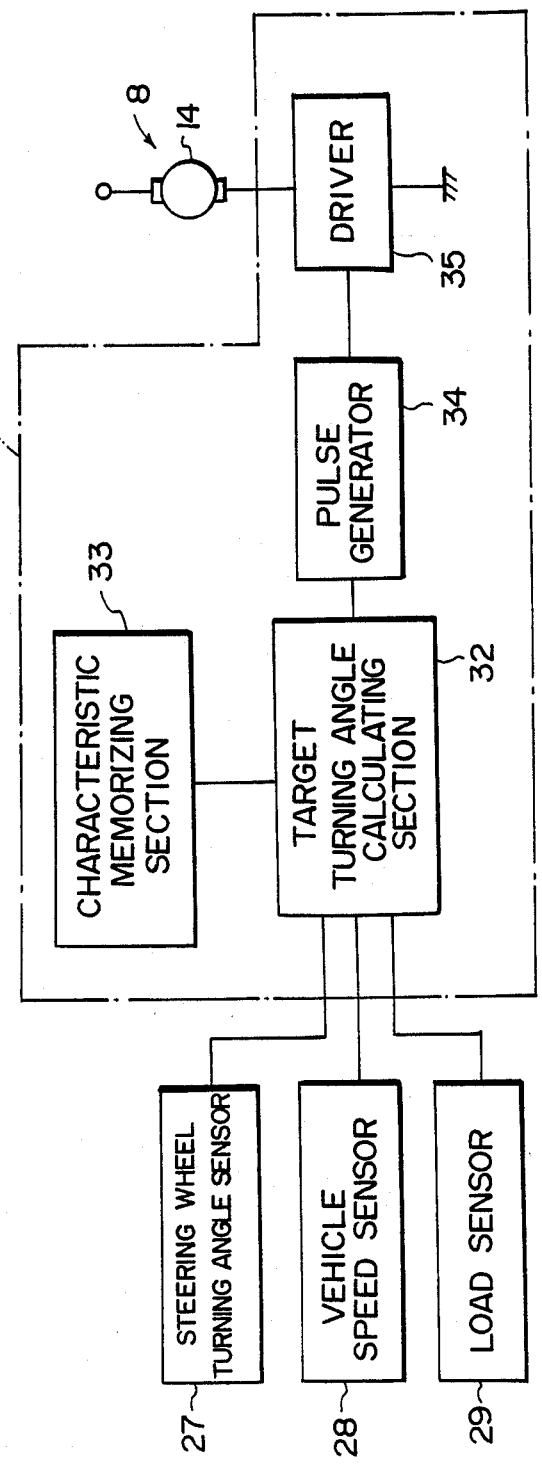
FIG. 2 is a block diagram of the controller employed in the four-wheel steering system of FIG. 1.

As shown in FIG. 2, the controller 26 comprises a target turning angle calculating section 32, a characteristic memorizing section 33, a pulse generator 34 and a driver 35. The target turning angle calculating section 32 receives the steering wheel turning angle signal from the steering wheel turning angle sensor 27, the vehicle speed signal from the vehicle speed sensor 28 and the load signal from the load sensor 29 and calculates a target rear wheel turning angle corresponding to the operating condition of the vehicle according to the rear wheel turning angle characteristics stored in the characteristics memorizing section 33.

The output signal of the target turning angle calculating section 32 representing the calculated target rear wheel turning angle is delivered to the pulse generator 34. The pulse generator 34 generates a pulse signal for controlling the pulse motor 14 to turn the rear wheels 7 by the target rear wheel turning angle and delivers it to the driver 35. The driver 35 converts the pulse signal into a driving pulse signal for driving the pulse motor 14 and outputs it to the pulse motor 14, thereby driving the rear wheel turning mechanism 8.

The rear wheel turning angle characteristics stored in the characteristic memorizing section 33 are the characteristics of the rear wheel turning angle ratio K (the ratio of the rear wheel turning angle to the front wheel turning angle) preset with respect to the vehicle speed V. The rear wheel turning angle ratio K is preset so that the vehicle lateral acceleration response characteristics and the vehicle heading response characteristics approximate each other as far as possible.

Figure 3:
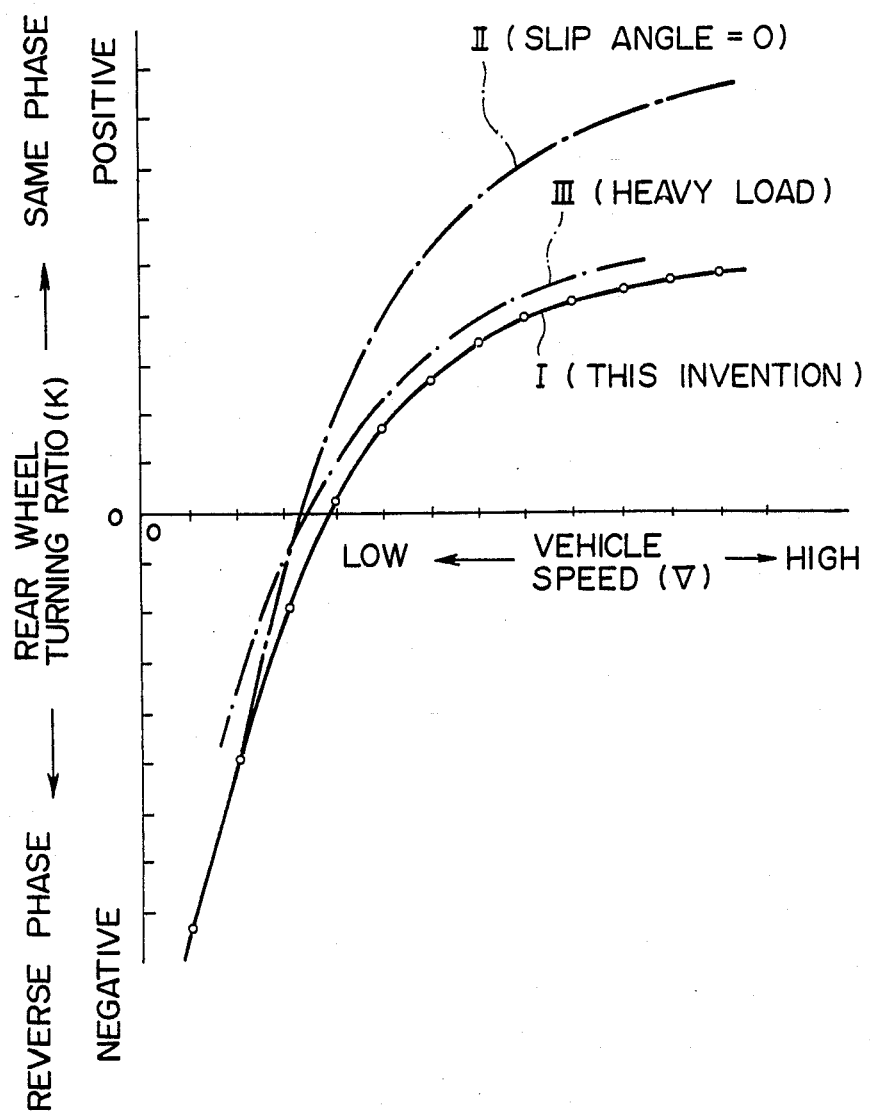
FIG. 3 is a view for illustrating the rear wheel turning angle ratio characteristics set in accordance with the present invention.

In the rear wheel turning angle characteristics shown in FIG. 3, the rear wheel turning angle ratio K is negative and large in absolute value in the low speed range. A negative rear wheel turning angle ratio K means that the rear wheels 7 are turned in the direction opposite to the front wheels 1 (the reverse phase). Therefore, when the rear wheel turning angle ratio K is negative and large in absolute value, the rear wheels 7 are turned in the direction opposite to the front wheels 1 by a relatively large angle for a given turning angle of the front wheels 1. As the vehicle speed increases, the rear wheel turning angle ratio K decreases in absolute value and becomes zero in the middle speed range. Then, the rear wheel turning angle ratio K turns positive (the same phase), and as the vehicle speed increases to the high speed range, the rear wheel turning angle ratio K increases. That is, in the high speed range, the rear wheels 7 are turned in the same direction as the front wheels 1 by a relatively large angle for a given turning angle of the front wheels 1.

The chained line II in FIG. 3 shows the rear wheel turning angle ratio characteristic curve when the rear wheel turning angle ratio characteristics are set so that the slip angle becomes zero. On the other hand, the rear wheel turning angle ratio characteristic curve I in FIG. 3 shows rear wheel turning angle ratio characteristics set so that the vehicle lateral acceleration response characteristics and the vehicle heading response characteristics generated by operation of the steering wheel 3 approximate each other in accordance with an embodiment of the present invention. As compared with the rear wheel turning angle ratio characteristic curve II, in the rear wheel turning angle ratio characteristic curve I, the rear wheel turning angle ratio in the same phase range corresponding to the middle and high speed ranges is smaller than that in the rear wheel turning angle ratio characteristic curve II, and the vehicle speed at which the rear wheel turning angle ratio becomes zero or changes from negative to positive is higher than in the rear wheel turning angle ratio characteristic curve II. Now, one manner of setting the rear wheel turning angle ratio characteristics will be described in detail.

Figure 4A:
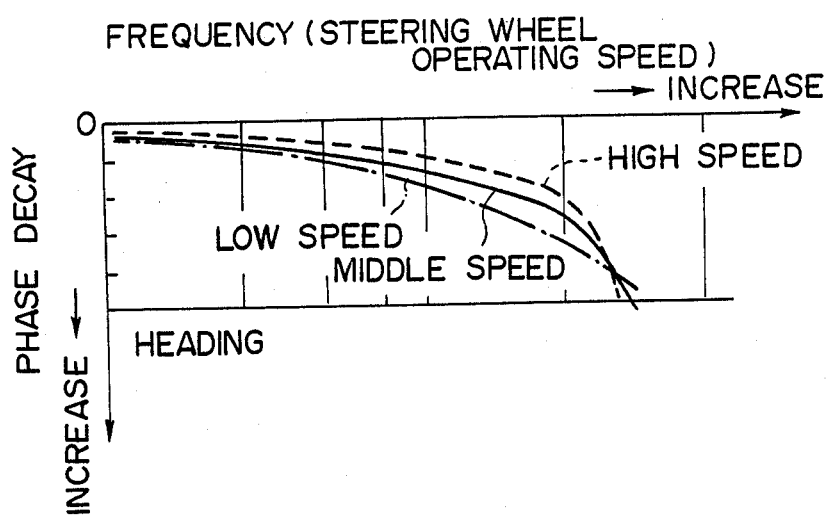
FIG. 4A is a view showing frequency-response curves for illustrating the change in the vehicle heading response characteristics with respect to the steering wheel operating speed with change in the vehicle speed.
Figure 4B:
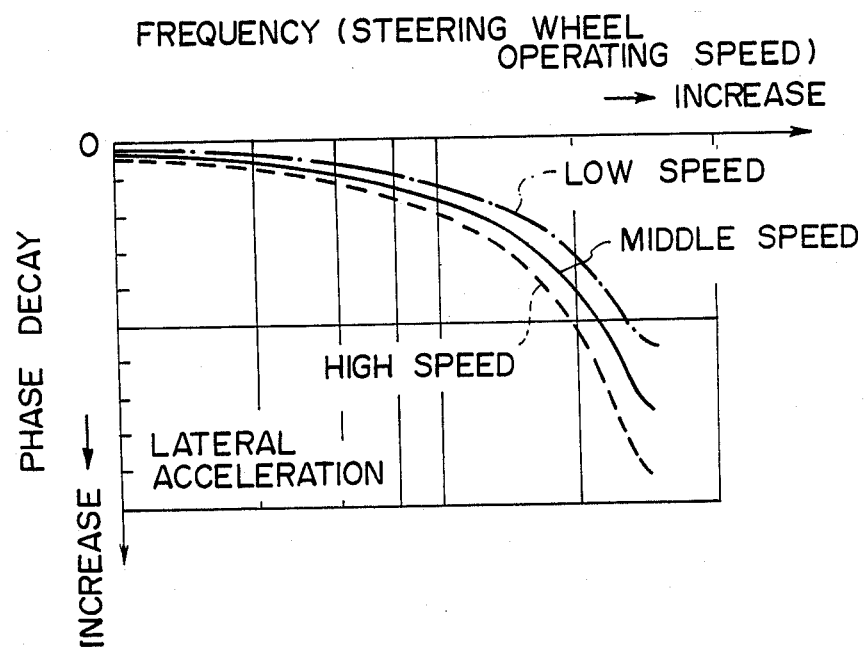
FIG. 4B is a view showing frequency-response curves for illustrating the change in the vehicle lateral acceleration response characteristics with respect to the steering wheel operating speed with change in the vehicle speed.

The vehicle heading (yaw rate) response characteristics and the vehicle lateral acceleration response characteristics with respect to operation of the steering wheel 3 change with change in the vehicle speed as shown in FIGS. 4A and 4B, respectively. In FIGS. 4A and 4B, the abscissa represents the input frequency corresponding to the steering wheel operating speed, and the ordinate represents the phase lag corresponding to the delay in response.

As can be seen from FIGS. 4A and 4B, in the case of the yaw rate or heading response, the delay in response is reduced as the vehicle speed increases, while in the case of the lateral acceleration response, the delay in response is increased as the vehicle speed increases.

Figure 5A:
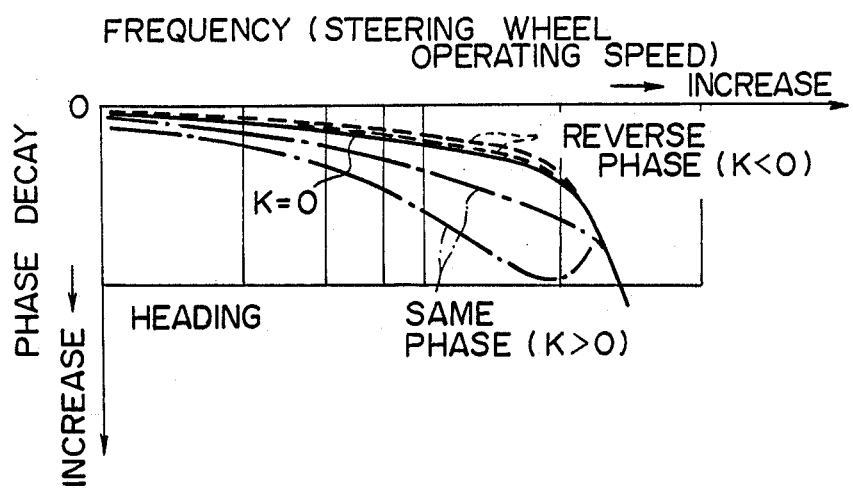
FIG. 5A is a view showing frequency-response curves for illustrating the change in the vehicle heading response characteristics with respect to the steering wheel operating speed with change in the rear wheel turning angle ratio.
Figure 5B:
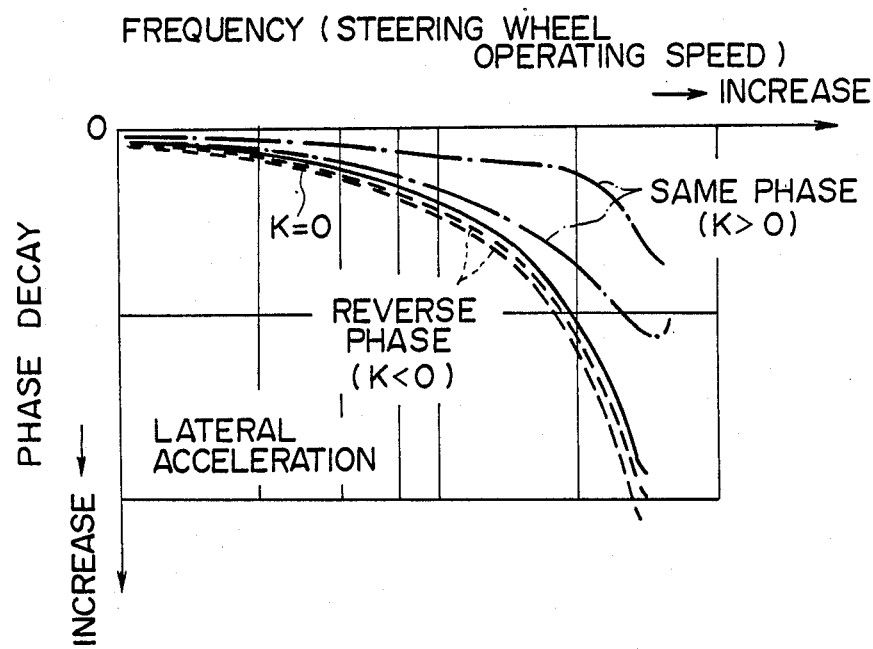
FIG. 5B is a view showing frequency-response curves for illustrating the change in the vehicle lateral acceleration response characteristics with respect to the steering wheel operating speed with change in the rear wheel turning angle ratio.

At a given vehicle speed, the vehicle heading response characteristics with respect to the steering wheel operating speed changes with change in the rear wheel turning angle ratio K as shown in FIG. 5A and the vehicle lateral acceleration response characteristics with respect to the steering wheel operating speed changes with change in the rear wheel turning angle ratio K as shown in FIG. 5B. In FIGS. 5A and 5B, $K>0$ represents that the rear wheels 7 are turned in the same phase, and $K<0$ represents that the rear wheels 7 are turned in the reverse phase.

As can be seen from FIG. 5A, in the case of the vehicle heading response characteristics, the delay in response increases as the absolute value of the rear wheel turning angle ratio K increases in the same phase and decreases as the absolute value of the rear wheel turning angle ratio K increases in the reverse phase. As can be seen from FIG. 5B, in the case of the vehicle lateral acceleration response characteristics, the delay in response increases as the absolute value of the rear wheel turning angle ratio K increases in the reverse phase and decreases as the absolute value of the rear wheel turning angle ratio K increases in the same phase. Thus, by appropriately selecting the rear wheel turning angle ratio K, the vehicle heading response characteristics and the vehicle lateral acceleration response characteristics can be made to approximate each other.

Thus by setting the rear wheel turning angle ratio K so that the vehicle heading response characteristics and the vehicle lateral acceleration response coincide with each other, improved steering characteristics affording a better steering feeling and superior in steering performance and the stability can be obtained. In other words, when searching for steering characteristics which afford an excellent steering feeling, the rear wheel turning angle ratio characteristics are found to be most preferred when at a value which causes the vehicle heading response characteristics and vehicle lateral acceleration response characteristics to approximate each other as far as possible.

Figure 6:
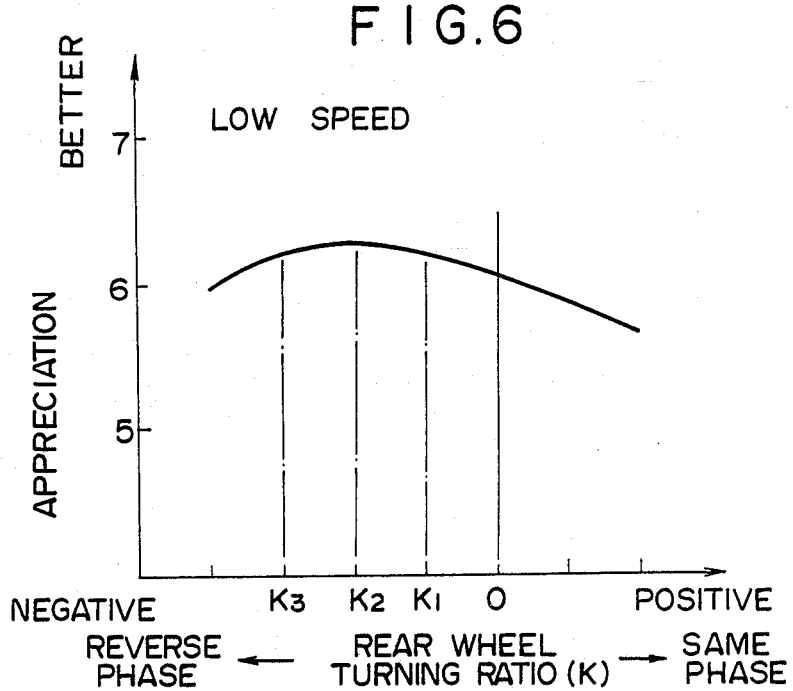
FIG. 6 is a graph showing the change in driver evaluation of steering feeling with change in the rear wheel turning angle ratio at a low speed.
Figure 7:
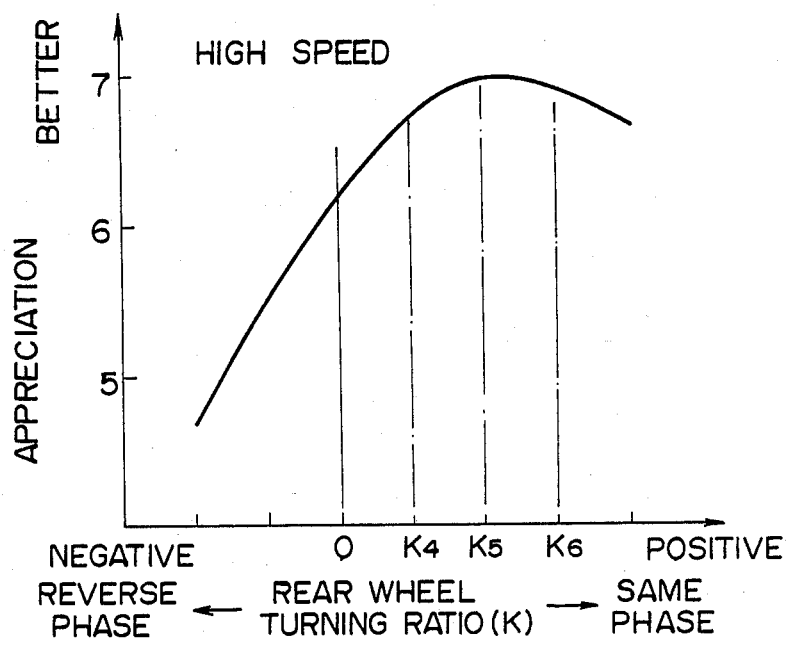
FIG. 7 is a graph showing the change in driver evaluation of steering feeling with change in the rear wheel turning angle ratio at a high speed.

A sensory test was conducted in which the driver's feeling about the steering properties was evaluated for various rear wheel turning angle ratios K at a given vehicle speed. Sharpness in response upon operation of the steering wheel 3, settling of the vehicle body after the steering wheel is turned and returned to the neutral position, on-the-rail feeling and similar items were evaluated in the case of low speed travel, and the individually evaluated items were then collectively evaluated. The results are shown in FIG. 6. In the case of high speed travel, sharpness in response upon operation of the steering wheel 3, settling of the vehicle body after the steering wheel is turned and returned to the neutral position, rear grip feeling, roll feeling and similar items were evaluated and the individually evaluated items were then collectively evaluated. The results are shown in FIG. 7.

As shown in FIG. 6, at a low speed, the steering feeling was most highly evaluated when the rear wheel turning angle ratio K was K2, K2 being negative or on the reverse phase side. The frequency characteristics of the vehicle heading response and the vehicle lateral acceleration response at the optimal rear wheel turning angle ratio K2 are shown in FIG. 8B, and those when the rear wheel turning angle ratio K is K1 and K3 near the optimal rear wheel turning angle ratio K2 are shown in FIGS. 8A and 8C, respectively.

Figure 8:
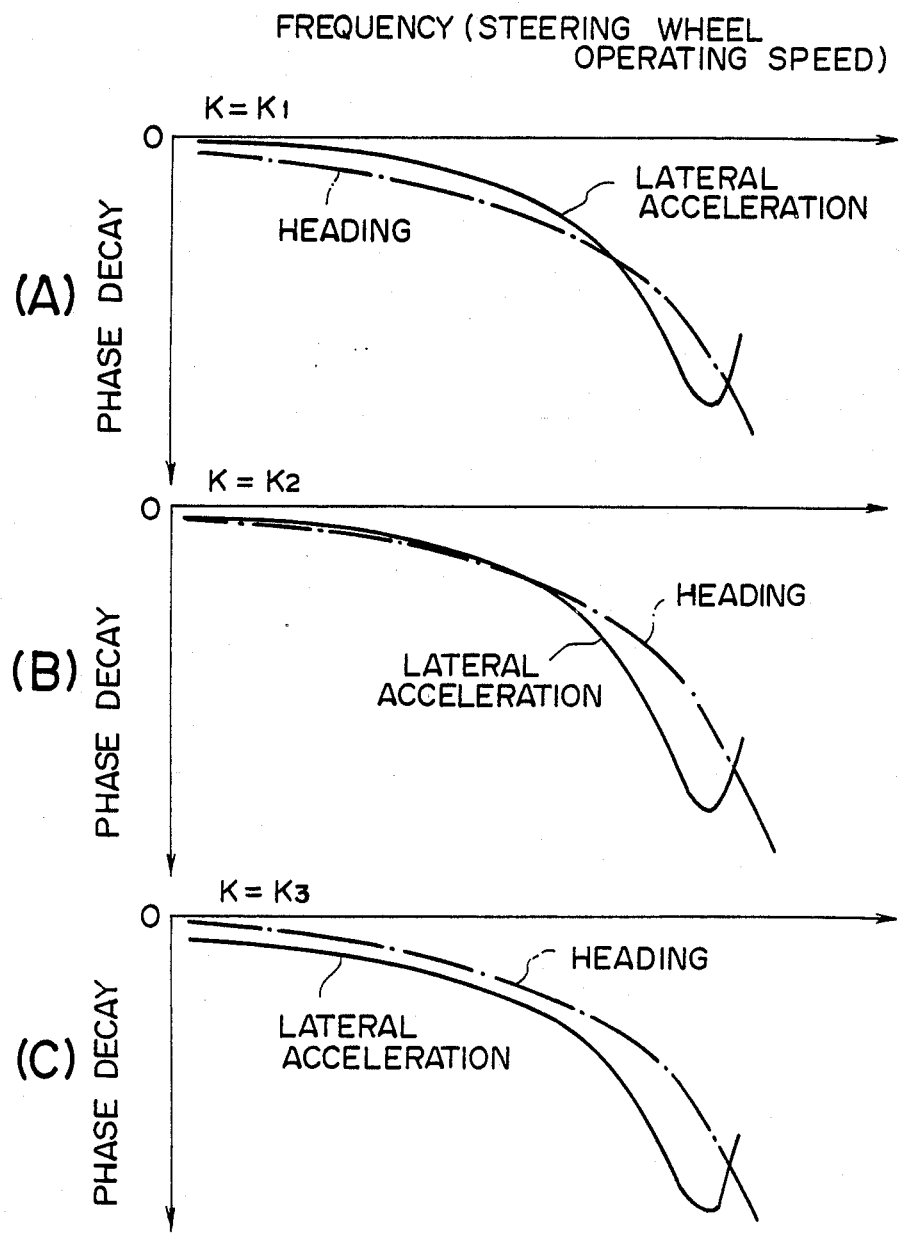
FIGS. 8A to 8C are views showing frequency-response curves for illustrating the vehicle heading response characteristics and the vehicle lateral acceleration response characteristics with respect to the steering wheel operating speed at different rear wheel turning angle ratio at a low speed.

As can be understood from FIG. 8B, when the rear wheel turning angle ratio K is K2 at a low speed, the vehicle heading response characteristics and the vehicle lateral acceleration response characteristics substantially coincide with each other.

On the other hand, when the rear wheel turning angle ratio K is K1 which is negative (reverse phase side) but smaller than K2 in absolute value, the delay in the vehicle heading response is larger than that in the vehicle lateral acceleration response as shown in FIG. 8A, while when the rear wheel turning angle ratio K is K3 which is negative but larger than K2 in absolute value, the delay in the vehicle lateral acceleration response is larger than that in the vehicle heading response as shown in FIG. 8C. The steering feeling at the rear wheel turning angle ratio of K1 or K3 at which the vehicle heading response characteristics and the vehicle lateral acceleration response characteristics are offset from each other is not highly evaluated.

In FIG. 8B, in the range in which the frequency corresponding to the steering wheel operating speed is high, the vehicle heading response characteristics and the vehicle lateral acceleration response characteristics do not coincide with each other. However, actually, the steering wheel is not operated at such a high speed without occurrence of an external disturbance. Therefore, the offset of the vehicle heading response characteristics and the vehicle lateral acceleration response characteristics in the high steering wheel operating speed range give rise to no practical problem.

In order to make the two types of characteristics coincide with each other even in the high steering wheel operating speed range, the steering wheel operating speed is detected and the rear wheel turning angle ratio K is corrected toward the same phase side when the steering wheel operating speed is high since the delay in the vehicle lateral acceleration response is larger than the delay in the vehicle heading response when the steering wheel operating speed is high (FIG. 5).

As shown in FIG. 7, at a high speed, the steering feeling was most highly evaluated when the rear wheel turning angle ratio K is K5, K5 being positive or in the same phase side. The frequency characteristics of the vehicle heading response and the vehicle lateral acceleration response at the optimal rear wheel turning angle ratio K5 are shown in FIG. 9B, and those when the rear wheel turning angle ratio K is K4 and K6 near the optimal rear wheel turning angle ratio K5 are shown in FIGS. 9A and 9C, respectively.

Figure 9:
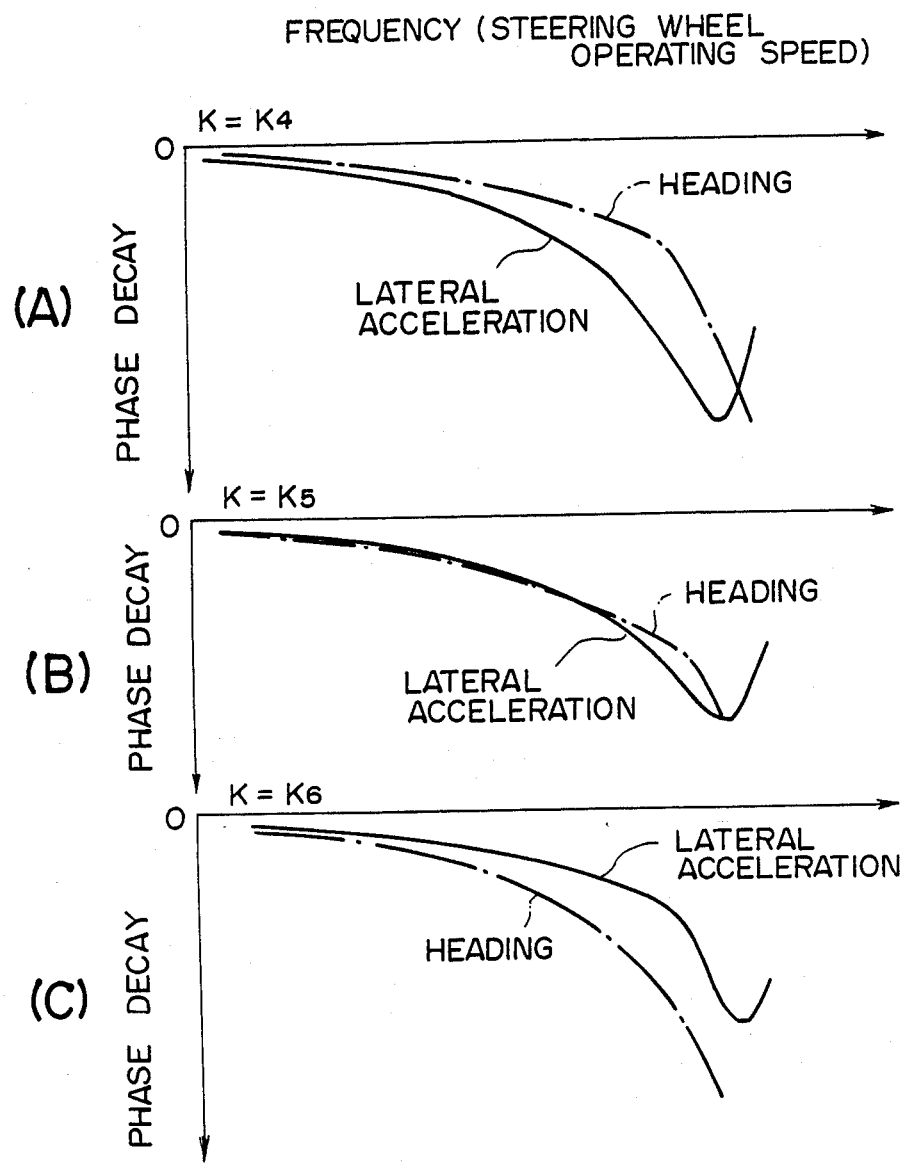
FIGS. 9A to 9C are views showing frequency-response curves for illustrating the vehicle heading response characteristics and the vehicle lateral acceleration response characteristics with respect to the steering wheel operating speed at different rear wheel turning angle ratio at a high speed.

As can be understood from FIG. 9B, when the rear wheel turning angle ratio K is K5 at a high speed, the vehicle heading response characteristics and the vehicle lateral acceleration response characteristics substantially coincide with each other.

On the other hand, when the rear wheel turning angle ratio K is K4 which is positive (same phase side) but smaller than K5 in absolute value, the delay in the vehicle lateral acceleration response is larger than that in the vehicle heading response as shown in FIG. 9A, while when the rear wheel turning angle ratio K is K6 which is positive but larger than K5 in absolute value, the delay in the vehicle heading response is larger than that in the vehicle lateral acceleration response as shown in FIG. 9C. The steering feeling at the rear wheel turning angle ratio of K4 or K6 at which the vehicle heading response characteristics and the vehicle lateral acceleration response characteristics are offset from each other is not highly evaluated.

Further, when the load on the vehicle is increased, the delay in the vehicle lateral acceleration response for a given vehicle speed tends to increase so that the vehicle lateral acceleration response characteristics and the vehicle heading response characteristics come out of coincidence with each other. Therefore, when the load on the vehicle is increased (the increase being detected through the output signal of the load sensor 29), the rear wheel turning angle ratio K is corrected toward the same phase side as shown by the line III in FIG. 3 so that the delay in the vehicle lateral acceleration response is reduced and the delay in the vehicle heading response is increased, thereby approximating the two delays to obtain an improved steering feeling following change in load.

In the rear wheel turning angle ratio characteristics shown by the curve II in FIG. 3 in which the rear wheel turning angle ratio K is set so that the slip angle is nullified, the rear wheel turning angle ratio characteristics are set shifted toward the positive or the same phase side from the rear wheel turning angle ratio characteristics shown by the curve I in accordance with the present invention, and therefore the delay in the vehicle heading response is increased while the delay in the vehicle lateral acceleration response is reduced as can be seen from FIG. 5. Therefore, the lateral acceleration is first produced upon operation of the steering wheel and then the yaw rate is produced with a time lag. Thus, high evaluation of the steering feeling is not obtained.

Though in the above embodiment, a so-called power steering mechanism is employed as the rear wheel turning mechanism 8 to make positive the rear wheel turning operation by the pulse motor 14, other types of rear wheel turning mechanisms may be employed.

I claim:

1. A method of controlling a four-wheel steering system for a vehicle including a vehicle speed sensor, a front wheel steering means, means for generating a signal representative of the turning angle of the front wheels, means for obtaining the rear wheel turning angle in response to the turning angle of the front wheels and the vehicle speed, and means for turning the rear wheels, the method comprising:
    detecting actuation of the front wheel steering means;
    detecting the vehicle speed sensed by the vehicle speed sensor;
    obtaining by a computing means the ratio of the rear wheel turning angle to the front wheel turning angle in response to said detected vehicle speed where said ratio is such that, at a predetermined steering wheel operating speed, the vehicle response to (a) lateral acceleration and (b) heading are substantially equal for (i) a first range of detected vehicle speeds where the front and rear wheels are turned in the reverse phase with respect to each other and (ii) a second range of detected vehicle speeds faster than the first range of speeds where the front and rear wheels are turned in the same phase; and
    turning the rear wheels through a turning angle determined by the obtained value of the ratio of the rear wheel angle to the front wheel turning angle and said turning angle of the front wheels.

2. A method of controlling the steering of a four-wheel steering system for a vehicle including a steering wheel, a front wheel turning means for turning the front wheels in response to operation of the steering wheel, means for generating a signal representative of the turning angle of the front wheels, a rear wheel turning means for turning the rear wheels in response to turning the front wheels, a vehicle speed sensor which detects the vehicle speed and outputs a vehicle speed signal, a steered angle ratio setting means which receives the vehicle speed signal and sets, at a predetermined steering wheel operating speed, the ratio of the rear wheel turning angle to the front wheel turning angle with reference to the vehicle speed to obtain a wheel turning angle ratio characteristic and a control means which controls the rear wheel turning means on the basis of the steered angle ratio characteristic set by the steered angle ratio selecting means and a turning angle of the front wheels, said method comprising
    obtaining by a computing means said ratio of the rear wheel turning angle to the front wheel turning angle in response to the sensed vehicle speed to lateral acceleration and response of the vehicle to heading substantially coincide with each other for (i) a first range of values of speeds sensed by said vehicle speed sensor where the front and rear wheels are turned in the reverse phase with respect to each other and (ii) a second range of sensed vehicle speeds where the front and rear wheels are turned in the same phase.

3. A method as in claim 1 or 2 where said four-wheel steering vehicle system includes a memory and said method includes storing said ratio of the rear wheel turning angle to the front wheel turning angle for said first and second vehicle speed ranges and where said ratio obtaining step includes reading from said memory the ratio corresponding to a particular vehicle speed.

4. A method as in claims 1 or 2 where said four-wheel steering vehicle system includes a steering wheel turning angle sensor as the means for generating said signal representative of the turning angle of the front wheels and said method turns the rear wheels in accordance with the sensed turning angle of the steering wheel and the obtained ratio of the rear wheel turning angle to the front wheel turning angle.

5. A method as in claim 1 and 2 where said four-wheel steering vehicle system includes a load sensor for detecting load on the vehicle and said method includes changing said ratio of the rear wheel turning angle to the front wheel turning angle according to the detected load.

6. A method for determining desired ratios of the rear wheel turning angle to the front wheel turning angle in a four-wheel steering system for a vehicle over a predetermined range of vehicle speeds, said method comprising the steps of:
    (a) selecting a current value of said ratio for a predetermined steering wheel operating speed;
    (b) selecting a current speed of said vehicle;

(c) determining the lateral acceleration response and the heading response of the vehicle for the current value of the ratio and said current speed;

(d) determining whether said lateral acceleration response and the heading response are substantially equal;

(e) if the lateral acceleration response and the heading response are not equal, incrementing the current value of said vehicle speed by a predetermined amount;

(f) repeating steps (c) through (e) until the lateral acceleration response and the heading response are equal to thereby determine said desired ratio for the current value of the incremented speed where the desired ratio corresponds to said current value of the ratio;

(g) incrementing said current value of the ratio by a predetermined amount;

(h) repeating the steps (b) through (f) until the desired ratio for the current value of the vehicle speed is determined; and (i) repeating steps (g) and (h) until said desired ratios are determined over said predetermined range of vehicle speeds.

7. A method for determining desired ratios of the rear wheel turning angle to the front wheel turning angle in a four-wheel steering system for a vehicle over a predetermined range of vehicle speed, said method comprising the steps of:

(a) selecting a current speed of said vehicle for a predetermined steering wheel operating speed;

(b) selecting a current value of said ratio;

(c) determining the lateral acceleration response and the heading response of the vehicle for the current value of the ratio and said current speed;

(d) determining whether said lateral acceleration response and the heading response are substantially equal;

(e) if the lateral acceleration response and the heading response are not equal, incrementing the current value of said ratio by a predetermined amount;

(f) repeating steps (c) through (e) until the lateral acceleration response and the heading response are equal to thereby determine said desired ratio for the current value of the speed where the desired ratio corresponds to said current value of the ratio;

(g) incrementing said current value of the speed by a predetermined amount;

(h) repeating steps (b) through (f) until the desired ratio for the current value of the vehicle speed is determined; and (i) repeating steps (g) and (h) until said desired ratios are determined over said predetermined range of vehicle speeds.

8. A method of controlling a four-wheel steering system for a vehicle including a vehicle speed sensor, a front wheel steering means, means for generating a signal representative of the turning angle of the front wheels, means for obtaining the rear wheel turning angle in response to the turning angle of the front wheels and the vehicle speed, and means for turning the read wheels, the method comprising:

detecting actuation of the front wheel steering means;

detecting the vehicle speed sensed by the vehicle speed sensor;

determining the lateral acceleration of the vehicle;

determining the heading of the vehicle;

determining by computing means the ratio of the rear wheel turning angle to the front wheel turning angle where said ratio is such that for said detected vehicle speed, the vehicle response to (a) said lateral acceleration and (b) said heading are substantially equal for (i) a first range of detected vehicle speeds where the front and rear wheels are turned in the reverse phase with respect to each other and (ii) a second range of detected vehicle speeds faster than the first range of speeds where the front and rear wheels are turned in the same phase; and turning the rear wheels through a turning angle determined by the obtained value of the ratio of the rear wheel angle to the front wheel turning angle and said turning angle of the front wheels.

* * * * *